United States Patent
Strange et al.

(10) Patent No.: US 7,143,249 B2
(45) Date of Patent: Nov. 28, 2006

(54) RESYNCHRONIZATION OF MIRRORED STORAGE DEVICES

(75) Inventors: Stephen H. Strange, Mountain View, CA (US); Srinivasan Viswanathan, Fremont, CA (US); Douglas P. Doucette, Freeland, WA (US); Steven R. Kleiman, Los Altos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 116 days.

(21) Appl. No.: 10/225,453

(22) Filed: Aug. 19, 2002

(65) Prior Publication Data

US 2003/0084242 A1    May 1, 2003

Related U.S. Application Data

(63) Continuation-in-part of application No. 10/154,414, filed on May 23, 2002, which is a continuation-in-part of application No. 09/684,487, filed on Oct. 4, 2000, now Pat. No. 6,654,912.

(51) Int. Cl.
G06F 12/16     (2006.01)
G06F 11/07     (2006.01)

(52) U.S. Cl. .................... 711/162; 711/114; 714/20
(58) Field of Classification Search ............... 711/114, 711/161, 162, 112, 165; 714/7, 12, 6, 20
See application file for complete search history.

(56) References Cited

U.S. PATENT DOCUMENTS

| | | | |
|---|---|---|---|
| 5,479,653 A | | 12/1995 | Jones |
| 5,519,844 A | * | 5/1996 | Stallmo ............... 711/114 |
| 5,960,169 A | * | 9/1999 | Styczinski ............... 714/6 |
| 6,023,780 A | * | 2/2000 | Iwatani ............... 714/6 |
| 6,085,298 A | * | 7/2000 | Ohran ............... 711/162 |
| 6,092,215 A | * | 7/2000 | Hodges et al. ............... 714/6 |
| 6,269,381 B1 | * | 7/2001 | St. Pierre et al. ............... 707/202 |
| 6,463,573 B1 | * | 10/2002 | Maddalozzo et al. ............... 716/6 |
| 6,470,462 B1 | * | 10/2002 | Karlsson et al. ............... 714/11 |
| 6,549,921 B1 | * | 4/2003 | Ofek ............... 707/204 |
| 6,654,912 B1 | | 11/2003 | Viswanathan et al. |
| 6,662,268 B1 | * | 12/2003 | McBrearty et al. ............... 711/114 |
| 6,671,705 B1 | | 12/2003 | Duprey et al. |
| 6,772,303 B1 | * | 8/2004 | Crockett et al. ............... 711/162 |
| 2002/0059505 A1 | | 5/2002 | St. Pierre et al. |
| 2004/0073831 A1 | | 4/2004 | Yanai et al. |

OTHER PUBLICATIONS

A performance evaluation of RAID architectures; Shenze Chen; Towsley, D.;☐☐Computers, IEEE Transactions on , vol. 45, Issue: 10 , Oct. 1996 ☐☐pp. 1116-1130.*

(Continued)

Primary Examiner—Brian R. Peugh
Assistant Examiner—Jared Rutz
(74) Attorney, Agent, or Firm—Arnold M. de Guzman

(57) ABSTRACT

In one embodiment, a first storage device and a second storage device form a mirror. When the first storage device loses synchronization with the second storage device, data present in the second storage device but not in the first storage device are identified. The identified data are then copied to the first storage device. In one embodiment, a method of rebuilding data in a storage device includes the act of replacing a failed storage device with a replacement storage device. Up-to-date data for the failed storage device, which may be stored in a corresponding mirror, may then be copied to the replacement storage device. Thereafter, the replacement storage device and any other storage devices that have lost synchronization with their mirror are resynchronized.

27 Claims, 12 Drawing Sheets

OTHER PUBLICATIONS

Analysis of repair algorithms for mirrored-disk systems; Kari, H.H.; Saikkonen, H.K.; Park, N.; Lombardi, F.;☐☐Reliability, IEEE Transactions on , vol. 46, Issue: 2 , Jun. 1997 ☐☐pp. 193-200.*
Introduction to redundant arrays of inexpensive disks (RAID);Patterson, D.A.; Chen, P.; Gibson, G.; Katz, R.H.; COMPCON Spring '89. Thirty-Fourth IEEE Computer Society International Conference: Intellectual Leverage, Digest of Papers. , 27 Feb.-3 Mar. 198.*
Patterson et al, A Case for Redundant Arrays of Inexpensive Disks (RAID), 1988, ACM.*

* cited by examiner

RESYNCHRONIZATION OF MIRRORED STORAGE DEVICES

REFERENCE TO RELATED APPLICATIONS

The present application is a continuation-in-part of U.S. application Ser. No. 10/154,414, filed on May 23, 2002 by Douglas P. Doucette, Stephen H. Strange, Srinivasan Viswanathan, and Steven R. Kleiman, entitled "Resynchronization Of Mirrored Storage Devices", which is a continuation-in-part of U.S. application Ser. No. 09/684,487, now U.S. Pat. No. 6,654,912, filed on Oct. 4, 2000 by Srinivasan Viswanathan and Steven R. Kleiman, entitled "Recovery of File System Data in File Servers Mirrored File System Volumes". Both of the just mentioned disclosures are incorporated herein by reference in their entirety.

BACKGROUND OF THE INVENTION

1. Field of the Invention

The present invention relates generally to computer systems, and more particularly but not exclusively to file systems and storage devices.

2. Description of the Background Art

Storage devices are employed to store data that are accessed by computer systems. Examples of storage devices include volatile and non-volatile memory, floppy drives, hard disk drives, tape drives, optical drives, etc. A storage device may be locally attached to an input/output (I/O) channel of a computer. For example, a hard disk drive may be connected to a computer's disk controller. A storage device may also be accessible over a network. Examples of such a storage device include network attached storage (NAS) and storage area network (SAN) devices. A storage device may be a single stand-alone component or be comprised of a system of storage devices such as in the case of Redundant Array Of Inexpensive Disks (RAID) groups and some Direct Access Storage Devices (DASD).

For mission-critical applications requiring high availability of stored data, various techniques for enhancing data reliability are typically employed. One such technique is to provide a "mirror" for each storage device. In a mirror arrangement, data are written to at least two storage devices. Thus, data may be read from either of the two storage devices so long as the two devices are operational and contain the same data. That is, either of the two storage devices may process read requests so long as the two devices are in synchronization.

When one of the storage devices fails, its mirror may be used to continue processing read and write requests. However, this also means that the failing storage device will be out of synchronization with its mirror. To avoid losing data in the event the mirror also fails, it is desirable to resynchronize the two storage devices as soon as the failing storage device becomes operational. Unfortunately, prior techniques for resynchronizing mirrored storage devices take a long time and consume a relatively large amount of processing time and I/O bandwidth. These not only increase the probability of data loss, but also result in performance degradation.

SUMMARY

In one embodiment, a first storage device and a second storage device form a mirrored pair of storage devices. When the first storage device loses synchronization with the second storage device, data present in the second storage device but not in the first storage device are identified. The identified data are then copied to the first storage device.

In one embodiment, a method of resynchronizing mirrored storage devices includes the act of creating a first storage usage information when both storage devices are accessible. When one of the storage devices goes down and then comes back up, a second storage usage information is created. A difference between the first storage usage information and the second storage usage information is determined and then used to resynchronize the previously down storage device with its mirror.

In one embodiment, a method of rebuilding data in a storage device includes the act of replacing a failed storage device with a replacement storage device. Up-to-date data for the failed storage device, which may be stored in a corresponding mirror, may then be copied to the replacement storage device. Thereafter, the replacement storage device and any other storage devices that have lost synchronization with their mirror are resynchronized.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
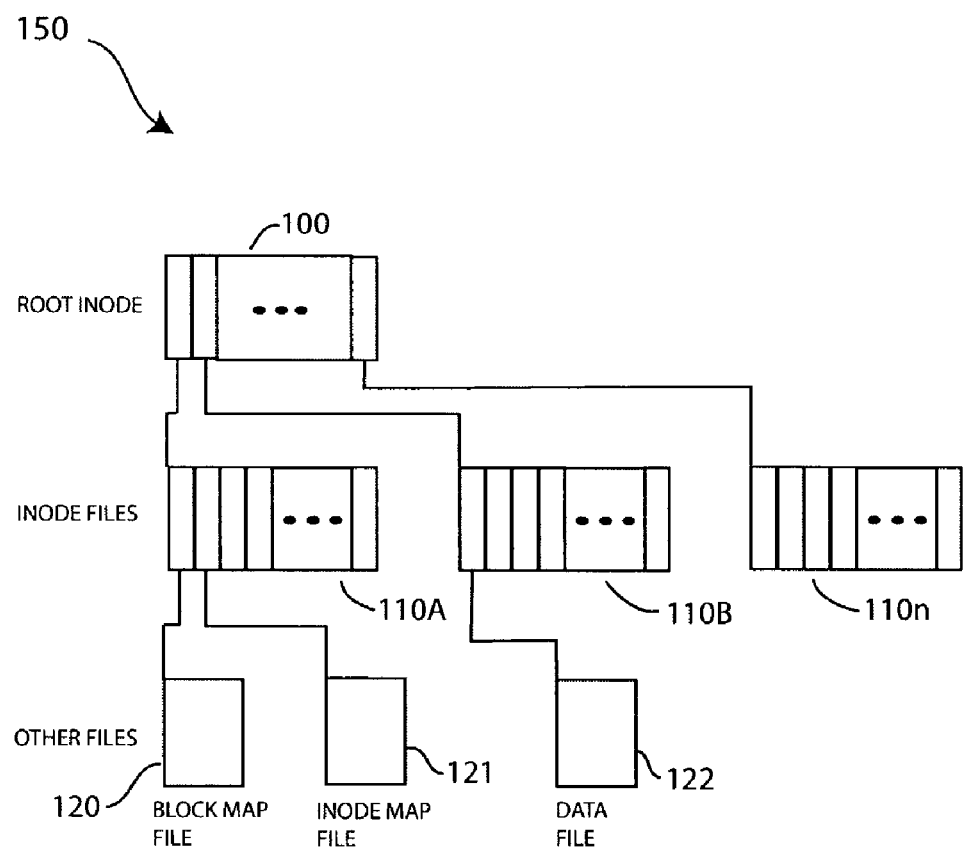
FIG. 1 shows a schematic diagram of an example file layout.

Referring now to FIG. 1, there is shown a schematic diagram of an example file layout 150. File layout 150 may be adopted by a file system to organize files. Similar file layouts are also disclosed in the following commonly-assigned disclosures, which are incorporated herein by reference in their entirety: (a) U.S. Pat. No. 6,289,356, filed on Sep. 14, 1998; (b) U.S. Pat. No. 5,963,962, filed on Jun. 30, 1998; and (c) U.S. Pat. No. 5,819,292, filed on May 31, 1995. It should be understood, however, that the present invention may also be adapted for use with other file layouts.

As shown in FIG. 1, file layout 150 has a tree structure with a root inode 100 as a base. Root inode 100 includes multiple blocks for describing one or more inode files 110 (i.e., 110A, 110B, . . . ). Each inode file 110 contains information about a file in file layout 150. A file may comprise one or more blocks of data, with each block being a storage location in a storage device.

As will be explained below, an inode file 110 may contain data or point to blocks containing data. Thus, a file may be accessed by consulting root inode 100 to find the inode file 110 that contains or points to the file's data. Using FIG. 1 as an example, data file 122 is stored in one or more blocks pointed to by inode 110B; inode 110B is in turn identified by root inode 100.

File layout 150 also includes a block map file 120 and an inode map file 121. Block map file 120 identifies free (i.e., unused) blocks, while inode map file 121 identifies free inodes. Block map file 120 and inode map file 121 may be accessed just like any other file in file layout 150. In other words, block map file 120 and inode map file 121 may be stored in blocks pointed to by an inode file 110, which is identified by root inode 100.

In one embodiment, root inode 100 is stored in a predetermined location in a storage device. This facilitates finding root inode 100 upon system boot-up. Because block map file 120, inode map file 121, and inode files 110 may be found by consulting root inode 100 as described above, they may be stored anywhere in the storage device.

Figure 2A:
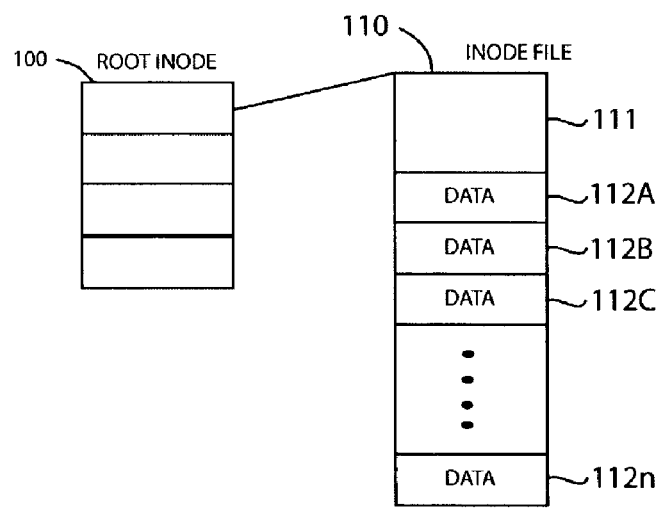
FIGS. 2A–2D show schematic diagrams of inode files in the file layout of FIG. 1.

Referring to FIG. 2A, there is shown a schematic diagram of an inode file 110 identified by a root inode 100. An inode file 110 includes a block 111 for storing general inode information such as a file's size, owner, permissions, etc. An inode file 110 also includes one or more blocks 112 (i.e., 112A, 112B, . . . ). Depending on the size of the file, blocks 112 may contain the file's data or pointers to the file's data. In the example of FIG. 2A, the file is small enough to fit all of its data in blocks 112.

In one embodiment, an inode file 110 includes 16 blocks 112, with each block 112 accommodating 4 bytes (i.e., 32 bits). Thus, in the just mentioned embodiment, files having a size of 64 bytes (i.e., 4-bytes×16) or less may be stored directly in an inode file 110.

Figure 2B:
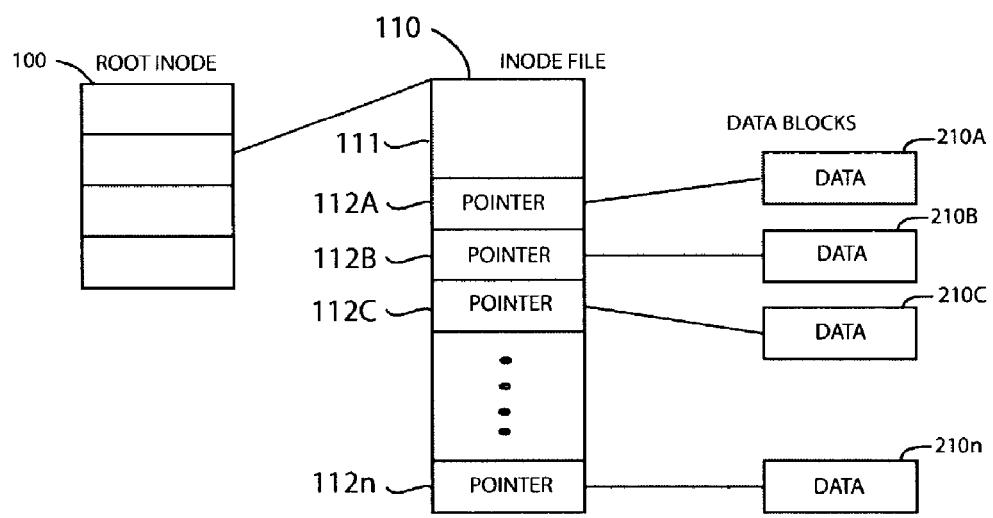

FIG. 2B shows a schematic diagram of an inode file 110 that contains pointers in its blocks 112. In the example of FIG. 2B, a pointer in a block 112 points to a data block 210 (i.e., 210A, 210B, . . . ) containing data. This allows an inode file 110 to accommodate files that are too large to fit in the inode file itself. In one embodiment, each of 16 blocks 112 may point to a 4 KB (kilo-byte) data block 210. Thus, in the just mentioned embodiment, an inode file 110 may accommodate files having a size of 64 KB (i.e., 16×4 KB) or less.

Figure 2C:
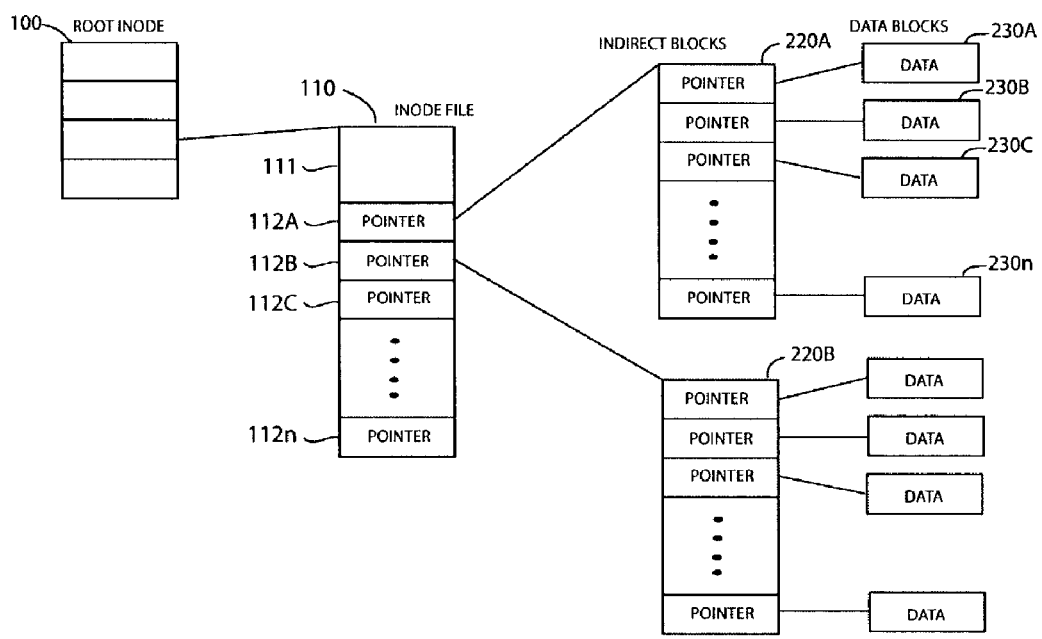

FIG. 2C shows a schematic diagram of another inode file 110 that contains pointers in its blocks 112. Each of the blocks 112 points to indirect blocks 220 (i.e., 220A, 220B, . . . ), each of which has blocks that point to a data block 230 (i.e., 230A, 230B, . . . ) containing data. Pointing to an indirect block 220 allows an inode file 110 to accommodate larger files. In one embodiment, an inode file 110 has 16 blocks 112 that each point to an indirect block 220; each indirect block 220 in turn has 1024 blocks that each point to a 4 KB data block 230. Thus, in the just mentioned embodiment, an inode file 110 may accommodate files having a size of 64 MB (mega-bytes) (i.e., 16×1024×4 KB) or less.

Figure 2D:
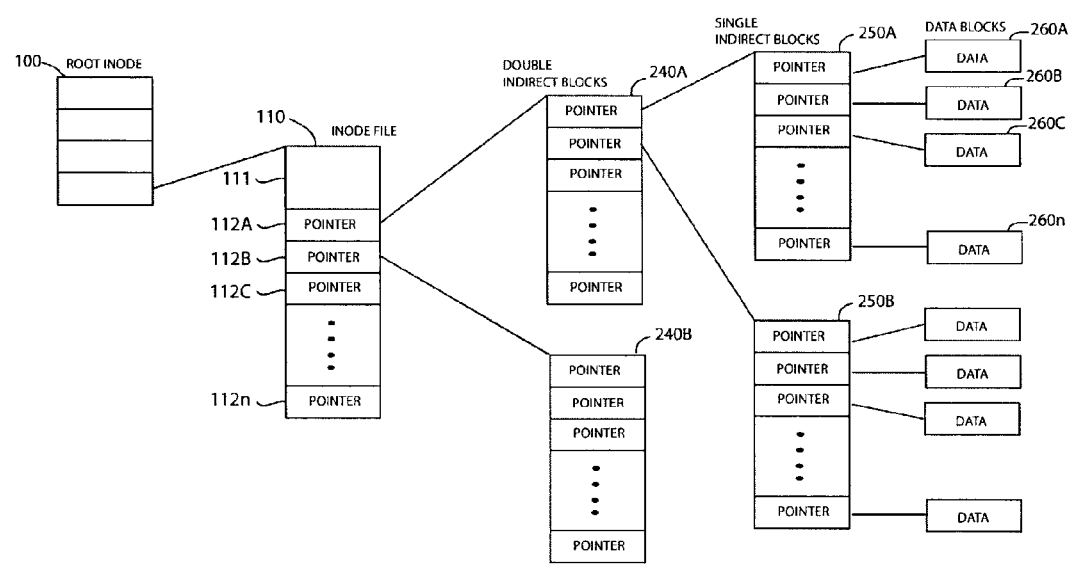

As can be appreciated, an inode file 110 may have several levels of indirection to accommodate even larger files. For example, FIG. 2D shows a schematic diagram of an inode file 110 that points to double indirect blocks 240 (i.e., 240A, 240B, . . . ), which point to single indirect blocks 250 (i.e., 250A, 250B, . . . ), which in turn point to data blocks 260 (i.e., 260A, 260B, . . . ). In one embodiment, an inode file 110 has 16 blocks 112 that each points to a double indirect block 240 containing 1024 blocks; each block in a double indirect block 240 points to a single indirect block 250 that contains 1024 blocks; each block in a single indirect block 250 points to a 4 KB data block 260. Thus, in the just mentioned embodiment, an inode file 110 may accommodate files having a size of 64 GB (giga-bytes) (i.e., 16×1024×1024×4 KB) or less.

Figure 3A:
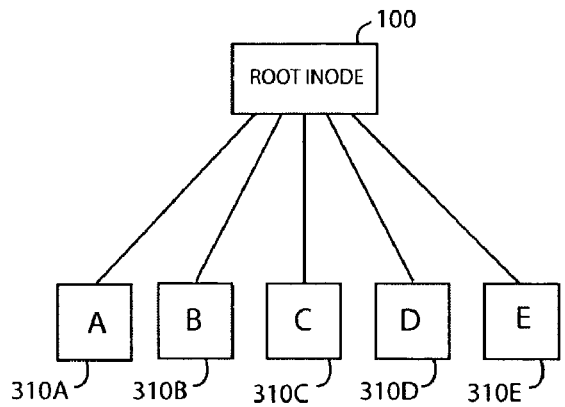
FIGS. 3A–3C show schematic diagrams illustrating the creation of a snapshot in the file layout of FIG. 1.

Referring now to FIG. 3A, there is shown a schematic diagram of a root inode 100 with one or more branches 310 (i.e., 310A, 310B, . . . ). FIG. 3A and the following FIGS. 3B and 3C do not show the details of each branch from a root inode 100 for clarity of illustration. Each branch 310 may include an inode file plus one or more levels of indirection to data blocks, if any.

Figure 3B:
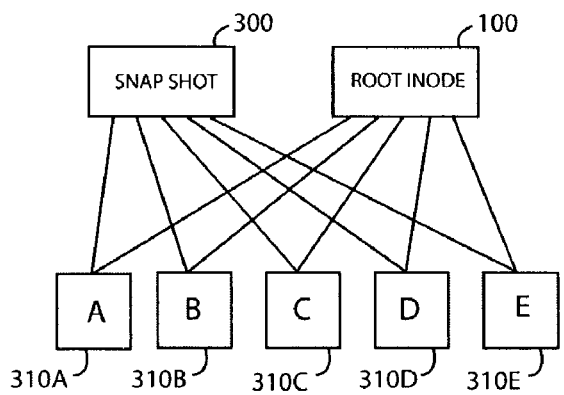

FIG. 3B shows a schematic diagram of a snapshot 300 created by copying a root inode 100. It is to be noted that "Snapshot" is a trademark of Network Appliance, Inc. It is used for purposes of this disclosure to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. The terms "PCPI" and "snapshot" shall be used interchangeably through out this disclosure without derogation of Network Appliance's trademark rights.

A snapshot 300, being a copy of a root inode 100, identifies all blocks identified by the root inode 100 at the time snapshot 300 was created. Because a snapshot 300 identifies but does not copy branches 310, a snapshot 300 does not consume a large amount of storage space. Generally speaking, a snapshot 300 provides storage usage information at a given moment in time.

Figure 3C:
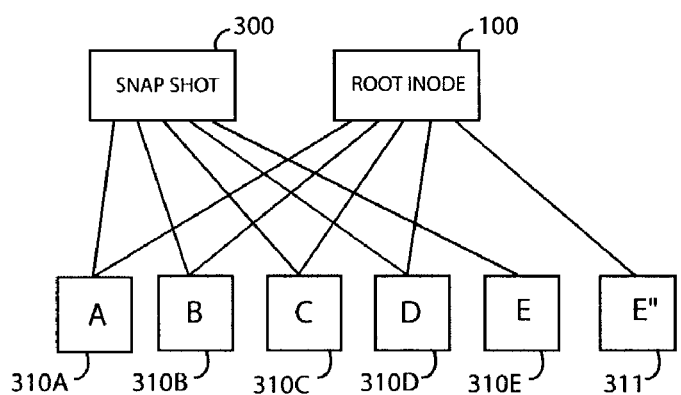

FIG. 3C shows a schematic diagram illustrating what happens when data in a branch 310 are modified by a write command. In one embodiment, writes may only be performed on unused blocks. That is, a used block is not overwritten when its data are modified; instead, an unused block is allocated to contain the modified data. Using FIG. 3C as an example, modifying data in branch 310E results in the creation of a new branch 311 containing the modified data. Branch 311 is created on new, unused blocks. The old branch 310E remains in the storage device and is still identified by snapshot 300. Root inode 100, on the other hand, breaks its pointer to branch 310E and now points to the new branch 311. Because branch 310E is still identified by snapshot 300, its data blocks may be readily recovered if desired.

As data identified by root inode 100 are modified, the number of retained old blocks may start to consume a large amount storage space. Thus, depending on the application, a snapshot 300 may be replaced by a new snapshot 300 from time to time to release old blocks, thereby making them available for new writes.

A consistency point count may be atomically increased every time a consistency point is established. For example, a consistency point count may be increased by one every time a snapshot 300 is created to establish a PCPI. When a file system becomes corrupted (e.g., root inode 100 lost information after an unclean shutdown), the PCPI (which is a snapshot 300 in this example) may be used to recreate the file system. As can be appreciated, a consistency point count gives an indication of how up to date a file system is. The higher the consistency point count, the more up to date the file system. For example, a file system with a consistency point count of 7 is more up to date than a version of that file system with a consistency point count of 4.

Figure 4:
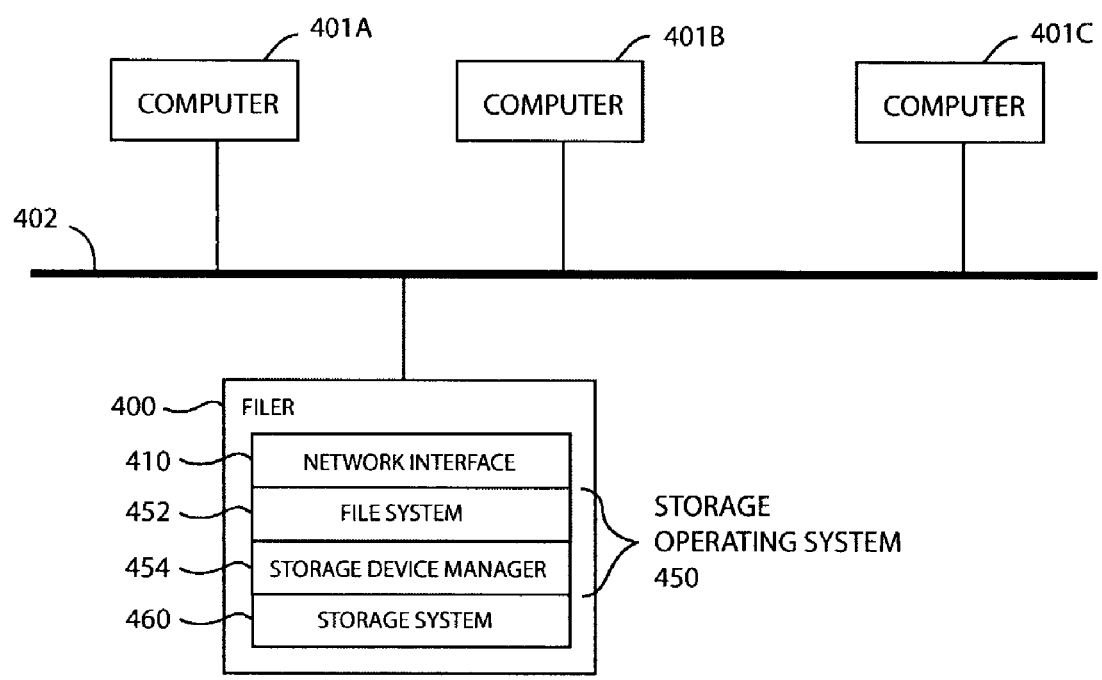
FIG. 4 shows a schematic diagram of a computing environment in accordance with an embodiment of the present invention.

Turning now to FIG. 4, there is shown a schematic diagram of a computing environment in accordance with an embodiment of the present invention. In the example of FIG. 4, one or more computers 401 (i.e., 401A, 401B, . . . ) are coupled to a filer 400 over a network 402. A computer 401 may be any type of data processing device capable of sending write and read requests to filer 400. A computer 401 may be, without limitation, a personal computer, minicomputer, mainframe computer, portable computer, workstation, wireless terminal, personal digital assistant, cellular phone, etc.

Network 402 may include various types of communication networks such as wide area networks, local area networks, the Internet, etc. Other nodes on network 402 such as gateways, routers, bridges, firewalls, etc. are not depicted in FIG. 4 for clarity of illustration.

Filer 400 provides data storage services over network 402. In one embodiment, filer 400 processes data read and write requests from a computer 401. Of course, filer 400 does not necessarily have to be accessible over network 402. Depending on the application, a filer 400 may also be locally attached to an I/O channel of a computer 401, for example.

As shown in FIG. 4, filer 400 may include a network interface 410, a storage operating system 450, and a storage system 460. Storage operating system 450 may further include a file system 452 and a storage device manager 454. Storage system 460 may include one or more storage devices. Components of filer 400 may be implemented in hardware, software, and/or firmware. For example, filer 400 may be a computer having one or more processors running computer-readable program code of storage operating system 450 in memory. Software components of filer 400 may be stored on computer-readable storage media (e.g., memories, CD-ROMS, tapes, disks, ZIP drive, . . . ) or transmitted over wired or wireless link to a computer 401.

Network interface 410 includes components for receiving storage-related service requests over network 402. Network interface 410 forwards a received service request to storage operating system 450, which processes the request by reading data from storage system 460 in the case of a read request, or by writing data to storage system 460 in the case of a write request. Data read from storage system 460 are transmitted over network 402 to the requesting computer 401. Similarly, data to be written to storage system 460 are received over network 402 from a computer 401.

Figure 5:
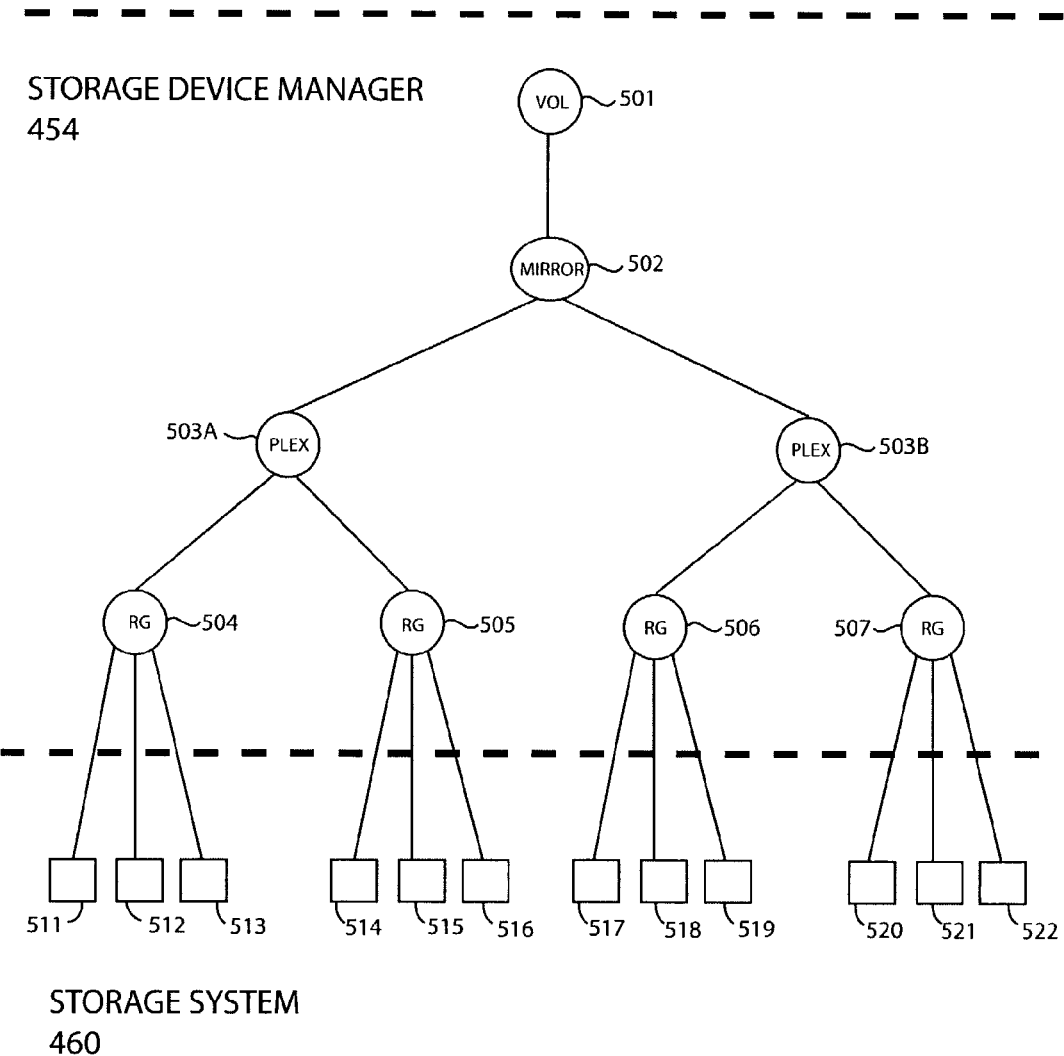
FIG. 5 shows a logical diagram illustrating the relationship between a file system, a storage device manager, and a storage system in accordance with an embodiment of the present invention.

FIG. 5 shows a logical diagram further illustrating the relationship between a file system 452, a storage device manager 454, and a storage system 460 in accordance with an embodiment of the present invention. In one embodiment, file system 452 and storage device manager 454 are implemented in software while storage system 460 is implemented in hardware. As can be appreciated, however, file system 452, storage device manager 454, and storage system 460 may be implemented in hardware, software, and/or firmware. For example, data structures, tables, and maps may be employed to define the logical interconnection between file system 452 and storage device manager 454. As another example, storage device manager 454 and storage system 460 may communicate via a disk controller.

File system 452 manages files that are stored in storage system 460. In one embodiment, file system 452 uses a file layout 150 (see FIG. 1) to organize files. That is, in one embodiment, file system 452 views files as a tree of blocks with a root inode as a base. File system 452 is capable of creating snapshots and consistency points in a manner previously described. In one embodiment, file system 452 organizes files in accordance with the Write-Anywhere-File Layout (WAFL) disclosed in the incorporated disclosures U.S. Pat. No. 6,289,356, U.S. Pat. No. 5,963,962, and U.S. Pat. No. 5,819,292. However, the present invention is not so limited and may also be used with other file systems and layouts.

Storage device manager 454 manages the storage devices in storage system 460. Storage device manager 454 receives read and write commands from file system 452 and processes the commands by accordingly accessing storage system 460. Storage device manager 454 takes a block's logical address from file system 452 and translates that logical address to a physical address in one or more storage devices in storage system 460. In one embodiment, storage device manager 454 manages storage devices in accordance with RAID level 4, and accordingly stripes data blocks across storage devices and uses separate parity storage devices. It should be understood, however, that the present invention may also be used with data storage architectures other than RAID level 4. For example, embodiments of the present invention may be used with other RAID levels, DASD's, and non-arrayed storage devices.

As shown in FIG. 5, storage device manager 454 is logically organized as a tree of objects that include a volume 501, a mirror 502, plexes 503 (i.e., 503A, 503B), and RAID groups 504–507. It is to be noted that implementing a mirror in a logical layer below file system 452 advantageously allows for a relatively transparent fail-over mechanism. For example, because file system 452 does not necessarily have to know of the existence of the mirror, a failing plex 503 does not have to be reported to file system 452. When a plex fails, file system 452 may still read and write data as before. This minimizes disruption to file system 452 and also simplifies its design.

Still referring to FIG. 5, volume 501 represents a file system. Mirror 502 is one level below volume 501 and manages a pair of mirrored plexes 503. Plex 503A is a duplicate of plex 503B, and vice versa. Each plex 503 represents a full copy of the file system of volume 501. In one embodiment, consistency points are established from time to time for each plex 503. As will be described further below, this allows storage device manager 454 to determine which plex is more up to date in the event both plexes go down and one of them needs to be resynchronized with the other.

Below each plex 503 is one or more RAID groups that have associated storage devices in storage system 460. In the example of FIG. 5, storage devices 511–513 belong to RAID group 504, storage devices 514–516 belong to RAID group 505, storage devices 517–519 belong to RAID group 506, and storage devices 520–522 belong to RAID group 507. RAID group 504 mirrors RAID group 506, while RAID group 505 mirrors RAID group 507. As can be appreciated, storage devices 511–522 do not have to be housed in the same cabinet or facility. For example, storage devices 511–516 may be located in a data center in one city, while storage devices 517–522 may be in another data center in another city. This advantageously allows data to remain available even if a facility housing one set of storage devices is hit by a disaster (e.g., fire, earthquake).

In one embodiment, storage devices 511–522 include hard disk drives communicating with storage device manager 454 over a Fiber Channel Arbitrated Loop link and configured in accordance with RAID level 4. Implementing a mirror with RAID level 4 significantly improves data availability. Ordinarily, RAID level 4 does not include mirroring. Thus, although a storage system according to RAID level 4 may survive a single disk failure, it may not be able to survive double disk failures. Implementing a mirror with RAID level 4 improves data availability by providing back up copies in the event of a double disk failure in one of the RAID groups.

Because plex 503A and plex 503B mirror each other, data may be accessed through either plex 503A or plex 503B. This allows data to be accessed from a surviving plex in the event one of the plexes goes down and becomes inaccessible. This is particularly advantageous in mission-critical applications where a high degree of data availability is required. To further improve data availability, plex 503A and plex 503B may also utilize separate pieces of hardware to communicate with storage system 460.

Figure 6:
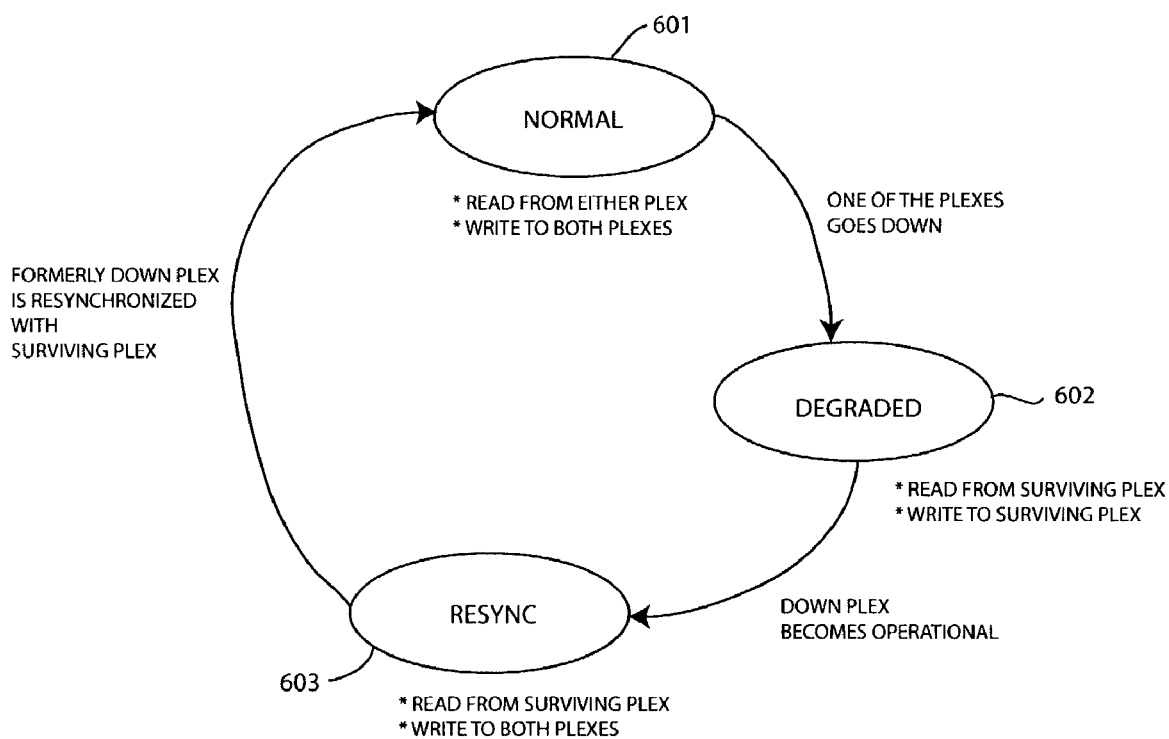
FIG. 6 shows a state diagram of a mirror in accordance with an embodiment of the present invention.

FIG. 6 shows a state diagram of mirror 502 in accordance with an embodiment of the present invention. At any given moment, mirror 502 may be in normal (state 601), degraded (state 602), or resync (state 603) state. Mirror 502 is in the normal state when both plexes are working and online. In the normal state, data may be read from either plex. Using FIG. 5 as an example, a block in storage device 511 may be read and passed through RAID group 504, plex 503A, mirror 502, volume 501, and then to file system 452. Alternatively, the same block may be read from storage device 517 and passed through RAID group 506, plex 503B, mirror 502, volume 501, and then to file system 452.

In the normal state, data are written to both plexes in response to a write command from file system 452. The writing of data to both plexes may progress simultaneously. Data may also be written to each plex sequentially. For example, write data received from file system 452 may be forwarded by mirror 502 to an available plex. After the available plex confirms that the data were successfully written to storage system 460, mirror 502 may then forward the same data to the other plex. For example, the data may first be stored through plex 503A. Once plex 503A sends a confirmation that the data were successfully written to storage system 460, mirror 502 may then forward the same data to plex 503B. In response, plex 503B may initiate writing of the data to storage system 460.

From the normal state, mirror 502 may go to the degraded state when either plex 503A or plex 503B goes down. A plex 503 may go down for a variety of reasons including when its associated storage devices fail, are placed offline, etc. A down plex loses synchronization with its mirror as time passes. The longer the down time, the more the down plex becomes outdated.

In the degraded state, read and write commands are processed by the surviving plex. For example, when plex 503B goes down and is survived by plex 503A, plex 503A assumes responsibility for processing all read and write commands. As can be appreciated, having a mirrored pair of plexes allows storage device manager 454 to continue to operate even after a plex goes down.

From the degraded state, mirror 502 goes to the resync state when the down plex (now a "previously down plex") becomes operational again. In the resync state, the previously down plex is resynchronized with the surviving plex. In other words, during the resync state, information in the previously down plex is updated to match that in the surviving plex. A technique for resynchronizing a previously down plex is later described in connection with FIG. 7. In one embodiment, resynchronization of a previously down plex with a surviving plex is performed by storage device manager 454. Performing resynchronization in a logical layer below file system 452 allows the resynchronization process to be relatively transparent to file system 452. This advantageously minimizes disruption to file system 452.

In the resync state, data are read from the surviving plex because the previously down plex may not yet have the most current data.

As mentioned, in one embodiment, data writes may only be performed on unused blocks. Because an unused block by definition has not been allocated in either plex while one of the plexes is down, data may be written to both plexes even if the mirror is still in the resync state. In other words, data may be written to the previously down plex even while it is still being resynchronized. As can be appreciated, the capability to write to the previously down plex while it is being resynchronized advantageously reduces the complexity of the resynchronization process.

From the resync state, mirror 502 returns to the normal state after the previously down plex is resynchronized with the surviving plex.

Figure 7:
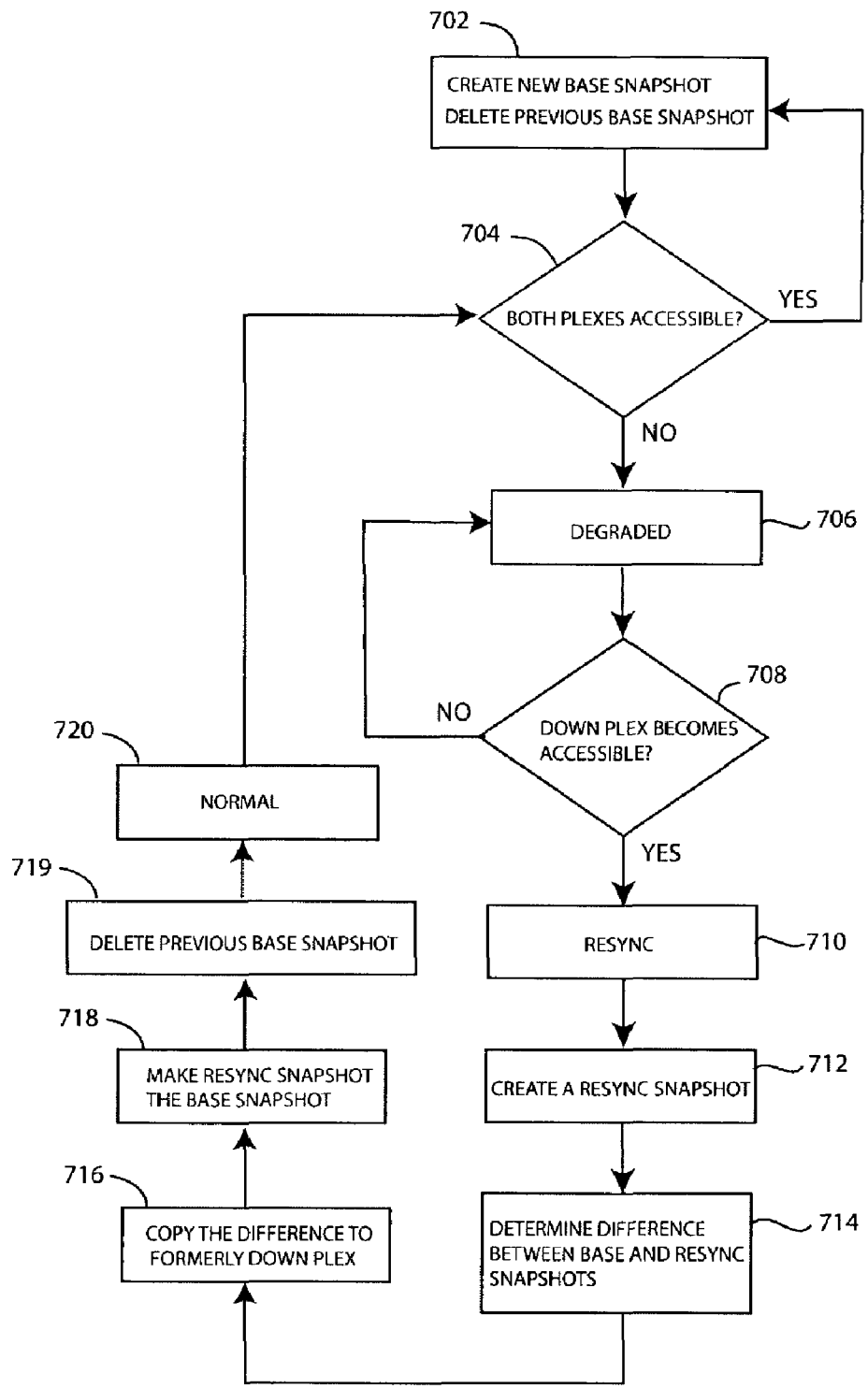
FIG. 7 shows a flow diagram of a method of resynchronizing a mirrored storage device in accordance with an embodiment of the present invention.

FIG. 7 shows a flow diagram of a method for resynchronizing a mirrored storage device in accordance with an embodiment of the present invention. In action 702, a snapshot arbitrarily referred to as a "base snapshot" is created by file system 452 at the request of storage device manager 454. The base snapshot, like a snapshot 300 (see FIG. 3), includes information about files in a file system.

In action 704 to action 702, at the request of storage device manager 454, file system 452 periodically creates a new base snapshot (and deletes the old one) while both plexes remain accessible. When one of the plexes goes down and becomes inaccessible, mirror 502 goes to the degraded state as indicated in action 706. In action 708 to action 706, mirror 502 remains in the degraded state while one of the plexes remains down.

In action 708 to action 710, mirror 502 goes to the resync state when the down plex becomes operational. In action 712, another snapshot arbitrarily referred to as a "resync snapshot" is created by file system 452 at the request of storage device manager 454. The resync snapshot is just like a snapshot 300 except that it is created when mirror 502 is in the resync state. Because file system 452, in one embodiment, only sees the most current plex, the resync snapshot is a copy of a root inode in the surviving plex.

In action 714, the difference between the base snapshot and the resync snapshot is determined. In one embodiment, file system 452 determines the difference by:
 (a) reading the base snapshot and the resync snapshot;
 (b) identifying blocks composing the base snapshot and blocks composing the resync snapshot; and
 (c) finding blocks that are in the resync snapshot but not in the base snapshot.

Note that the base snapshot is created at an earlier time when both plexes are up (normal state), whereas the resync snapshot is created at a later time when a plex that has gone down goes back up (resync state). Thus, the difference between the base and resync snapshots represents data that were written to the surviving plex while mirror 502 is in the degraded state.

Figure 8A:
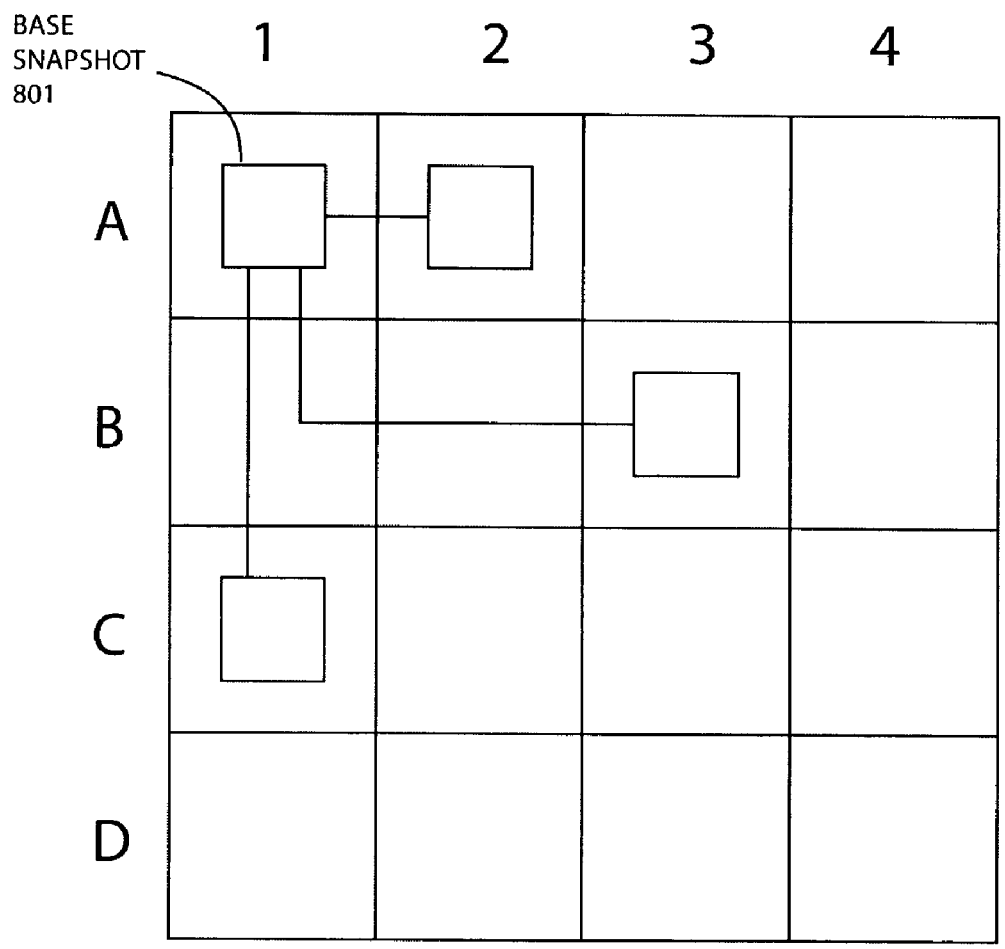
FIGS. 8A and 8B show schematic diagrams further illustrating an action in the flow diagram of FIG. 7.
Figure 8B:
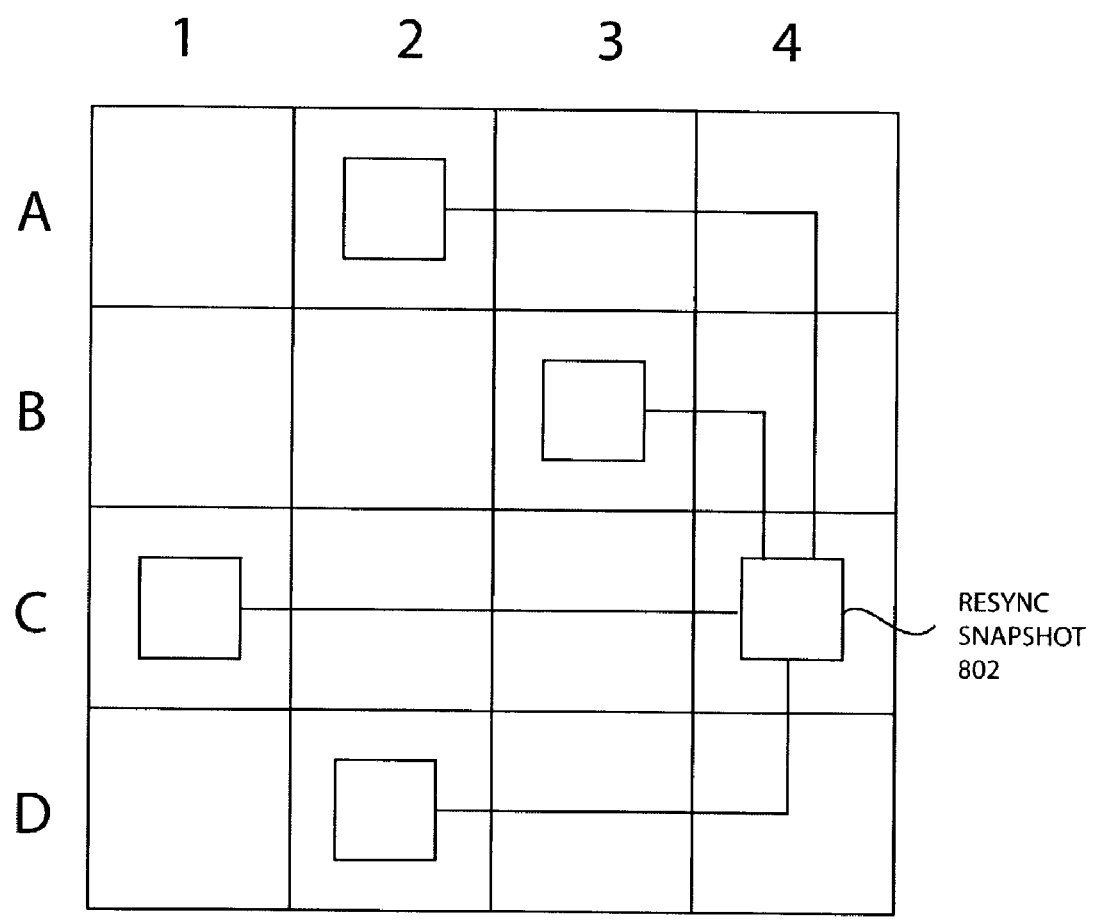

FIGS. 8A and 8B further illustrate action 714. FIGS. 8A and 8B represent storage locations of a storage device, with each cell representing one or more blocks. In FIG. 8A, cell A1 holds a base snapshot 801. Base snapshot 801 identifies blocks in cells A2, B3, and C1. In FIG. 8B, cell C4 holds a resync snapshot 802 created while mirror 502 is in the resync state. Like base snapshot 801, resync snapshot 802 identifies blocks in cells A2, B3, and C1. Resync snapshot 802 additionally identifies blocks in cell D2. Thus, the blocks in cell D2 compose the difference between base snapshot 801 and resync snapshot 802.

Continuing in action 716 of FIG. 7, the difference between the base and resync snapshots is copied to the formerly down plex. In one embodiment, this is performed by storage device manager 454 by copying to the formerly down plex the blocks that are in the resync snapshot but not in the base snapshot. Using FIG. 8B as an example, blocks in cell D2 are copied to the formerly down plex. Advantageously, this speeds up the resynchronization process and thus shortens the period when only one plex is operational. Also, compared with prior techniques where all blocks of the surviving plex are copied to a formerly down plex, copying the difference to the formerly down plex consumes less processing time and I/O bandwidth.

In action 718, the resync snapshot is made the base snapshot. In action 719, the previous base snapshot is deleted. Thereafter, mirror 502 goes to the normal state as indicated in action 720. The cycle then continues with file system 452 periodically creating base snapshots while both plexes remain accessible.

It is to be noted that the flow diagram of FIG. 7 may also be used in the event both plexes go down. In that case, the plex with the higher consistency point count is designated the surviving plex while the other plex is designated the down plex. Thereafter, the down plex is resynchronized with the surviving plex as in FIG. 7. For example, if plexes 503A and 503B both go down and plex 503A has a higher consistency point count than plex 503B, plex 503A is designated the surviving plex while plex 503B is designated the down plex. When both plexes become operational again, plex 503B may then be resynchronized with plex 503A as in actions 710, 712, 714, 716, 718, etc.

As can be appreciated by those of ordinary skill reading the present disclosure, the above disclosed techniques may also be advantageously employed in situations where an entire RAID group is lost because of a double disk failure, for example. Ordinarily, when an entire RAID group is lost, data in all storage devices in that RAID group as well as data in storage devices in other RAID groups belonging to the same plex are recopied using data from a mirror plex. In other words, the conventional approach is to rebuild all data in all RAID groups in a plex even when only a single RAID group in that plex becomes irreparable. Rebuilding all data in all RAID groups generally consumes a lot of processing time and I/O bandwidth.

A technique for rebuilding data in storage devices in accordance with an embodiment of the present invention is now described. In the example of FIG. 5, RAID groups 504 and 505 belong to plex 503A. A plex, such as plex 503A, may be thought of as a set of storage devices. Thus, plex 503A may be thought of as a set of storage devices having RAID groups 504 and 505 as members of the set. Of course, the members of plex 503A do not have to be a RAID group but may also be a single storage device, a system of storage devices, a DASD, etc. In the example of FIG. 5, storage devices 511–513 belong to RAID group 504 while storage devices 514–516 belong to RAID group 505. Note that FIG. 5 merely shows an example logical representation of an embodiment, and should not be construed as a limitation.

In the event that a RAID group fails, say RAID group 504 because of failing storage devices 511 and 512, plex 503A will also fail and thereby transition mirror 502 from a normal state to a degraded state. Storage devices 511 and 512 (the failed storage devices) may then be replaced with replacement storage devices. The replacement storage devices may be spare storage devices in RAID group 504, or new storage devices from a spares pool or inventory. A so-called "level-0 resync" may then be performed on the replacement storage devices. A level-0 resync is a resynchronization process whereby all data in a storage device are recopied using up-to-date data, which may be in a mirror. In the example of FIG. 5, performing a level-0 resync on the replacement storage devices involves copying all data from RAID group 506 to RAID group 504. Note that in this example, RAID group 504 forms a mirror with RAID group 506, while RAID group 505 forms a mirror with RAID group 507. Depending on implementation, a level-0 resync may also be performed on the replacement storage devices by copying data from storage devices 517 and 518 instead of the entire RAID group 506. However, depending on implementation, it may be simpler to copy the entire RAID group during a level-0 resync because a RAID group typically behaves and is mapped like a single storage device.

After the level-0 resync, plex 503A may be resynchronized with plex 503B as previously discussed in connection with FIG. 7. That is, after the level-0 resync of RAID group 504, plex 503A may be resynchronized based on the difference between a snapshot created while mirror 502 is in a normal state (e.g., a base snapshot) and a snapshot created while mirror 502 is in a resync state (e.g., a resync snapshot).

As can be appreciated, recopying all data that need to be recopied while preserving those that are still accessible helps decrease the time it takes to rebuild data in storage devices.

Figure 9:
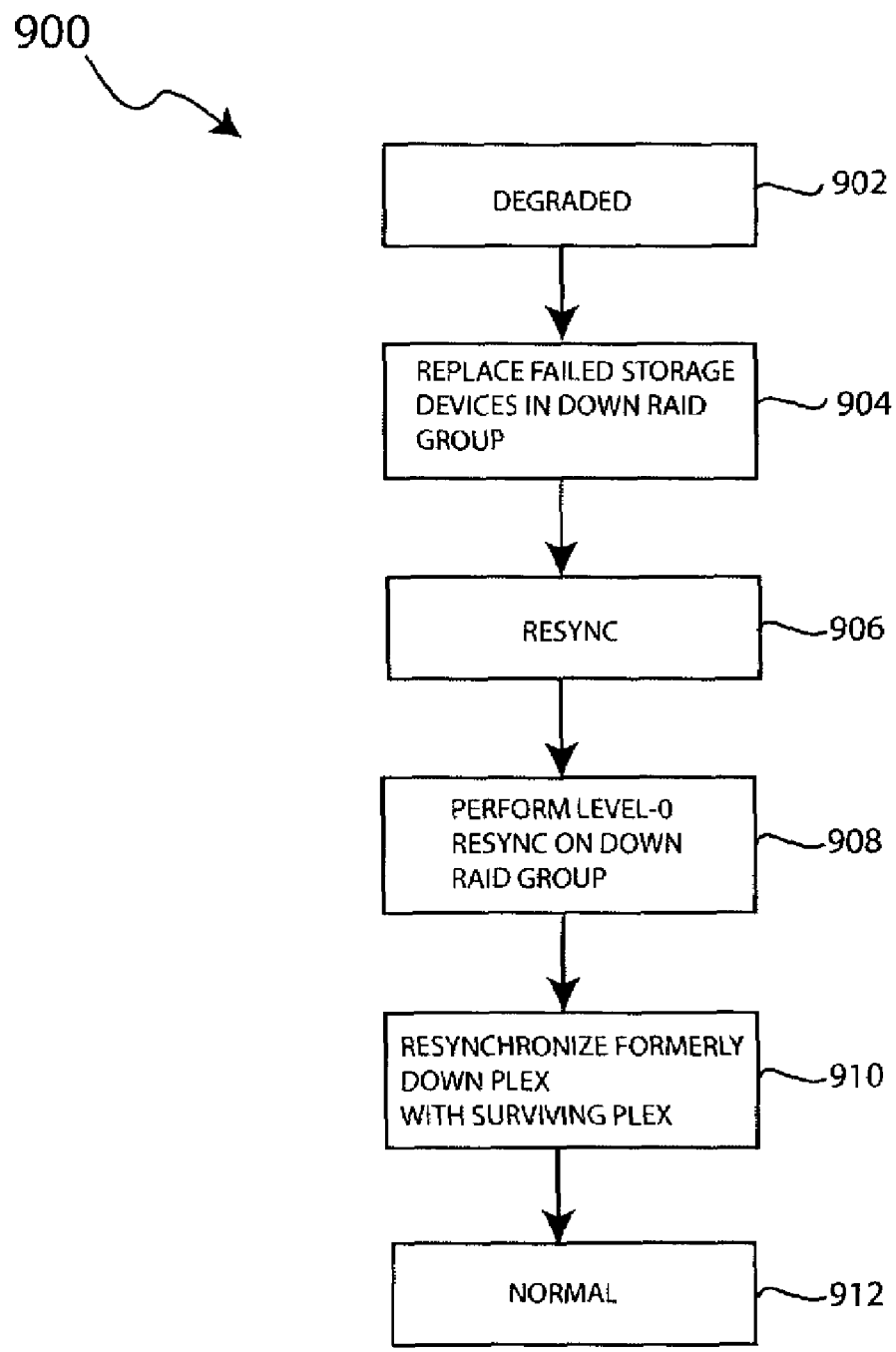
FIG. 9 shows a flow diagram of a method for rebuilding data in storage devices in accordance with an embodiment of the present invention.

FIG. 9 shows a flow diagram of a method 900 for rebuilding data in storage devices in accordance with an embodiment of the present invention. In action 902, a mirror transitions to a degraded state after a plex goes down and becomes inaccessible. The mirror may include more than one plex; the plex that is down is referred to as a "down plex" whereas the plex that survives is referred to as a "surviving plex".

In action 904, the failing storage devices in a RAID group belonging to the down plex are identified and replaced with replacement storage devices. The replacement storage devices may be spares in the down RAID group or from a spares inventory, for example. The failing storage devices may be identified a variety of ways including by matching inaccessible data blocks to their corresponding storage devices using a block map, running diagnostics on the storage devices, monitoring for hardware or software alarms, etc.

In action 906, the mirror transitions to a resync state after the failing storage devices have been replaced. At this point, all storage devices in the mirror are accessible but are not synchronized. The down plex is now referred to as the "formerly down plex".

In action 908, a level-0 resync is performed on the down RAID group. A level-0 resync may be performed by copying all data from another RAID group forming a mirror with the down RAID group. Depending on implementation, the level-0 resync may be performed on all storage devices in the down RAID group or only on the replacement storage devices in the down RAID group.

In action 910, the formerly down plex is resynchronized with the surviving plex by copying to the down plex data that are in the surviving plex but not in the down plex (e.g., see FIG. 7).

In action 912, the mirror transitions back to the normal state after the formerly down plex is resynchronized with the surviving plex.

Note that actions 904 and 906 may also be integrated with the flow diagram of FIG. 7. For example, actions 904 and 906 may be performed after action 706 is performed. In other words, actions 904 and 906 may follow action 706, and action 708 may follow action 906, etc.

While specific embodiments have been provided, it is to be understood that these embodiments are for illustration purposes and not limiting. Many additional embodiments will be apparent to persons of ordinary skill in the art reading this disclosure. For example, while the invention has been described with respect to network attached storage (NAS) systems having a file system for servicing file-based data access requests from clients, aspects of the invention can also be employed in other types of storage systems. Such other types of storage systems that can advantageously utilize aspects of the invention include storage area network (SAN) and other block based systems for servicing block-based data access requests from clients. Unlike the described embodiments, these other storage system do not need to manage file semantics. Moreover, with storage consolidation, aspects of the invention can be practiced in storage systems that service both file-based requests typical of NAS systems and block-based requests typical of SAN systems. Thus the invention can be employed to provide data reliability guarantees without regard to higher level storage functionality specific to NAS or SAN systems. The invention is limited only by the following claims.

What is claimed is:

1. A method of rebuilding data in a storage device, the method comprising:
   replacing a failed storage device in a first group of storage devices, the first group of storage devices belonging to a first set of storage devices;
   writing up-to-date data to the first group of storage devices;
   determining a difference between data stored in the first set of storage devices and data stored in a second set of storage devices, by comparing a first storage usage information created prior to failure of the failed storage device and a second storage usage information created after the up-to-date data is written to the first group of storage devices, wherein the first storage usage information is a point-in-time representation of a file system and the second storage usage information is another point-in-time representation of the file system; and
   resynchronizing the first set of storage devices with the second set of storage devices based on the difference, wherein the difference between the first storage usage information and the second storage usage information represents data written to the second set of storage devices when the first set of storage devices is in a degraded state.

2. The method of claim 1 wherein the first set of storage devices forms a mirror with the second set of storage devices.

3. The method of claim 1 wherein storage devices in the first group of storage devices are configured in accordance with RAID level 4.

4. The method of claim 1 wherein determining the difference comprises:
   identifying data stored in the first set of storage devices but not in the second set of storage devices.

5. The method of claim 1, wherein the difference is stored in a previously unused block in the first group of storage devices.

6. The method of claim 1, further comprising:
   storing write data in a storage device in the first set of storage devices while concurrently resynchronizing the storage device.

7. A system for providing data storage services over a computer network, the system comprising:
   a file system;
   a storage device manager configured to service data access requests from the file system, the storage device manager configured to mirror a first set of storage devices with a second set of storage devices; and
   wherein the storage device manager is configured to resynchronize the second set of storage devices with the first set of storage devices by using data from the first set of storage devices to rebuild data in a replacement storage device in the second set of storage devices and by copying data determined to be in the first set of storage devices but not in the second set of storage devices, wherein the storage device manager determines if data is in the first set but not in the second set by comparing a first storage usage information created prior to failure of the second set and a second storage usage information created after up-to-date data is written into the replacement storage device,
   wherein the first storage usage information is a point-in-time representation of the file system and the second storage usage information is another point-in-time representation of the file system, wherein a difference between the first storage usage information and the second storage usage information represents data written to the first set of storage devices when the second set of storage devices is in a degraded state.

8. The system of claim 7 wherein the first set of storage devices and the second set of storage devices comprise groups of storage devices configured in accordance with RAID level 4.

9. The system of claim 7 wherein the first set of storage devices and the second set of storage devices are not housed in the same facility.

10. The system of claim 7, wherein the data that i& in the first set but not in the second set comprises one or more blocks that are in the second storage usage information and are not in the first storage usage information.

11. The system of claim 7, wherein the difference comprises one or more blocks that are in the second storage usage information and are not in the first storage usage information.

12. The system of claim 7, wherein a difference the first storage usage information and the second storage usage information is stored in the first set of storage devices.

13. The system of claim 7, wherein the storage device manager is configured to store write data in a storage device in the second set of storage devices while concurrently resynchronizing the storage device.

14. A method of rebuilding data in a storage device, the method comprising:
  replacing a failed storage device with a replacement storage device, the failed storage device belonging to a first set of storage devices that forms a mirror with a second set of storage devices;
  writing up-to-date data to the replacement storage device;
  determining a difference between a surviving storage device in the first set of storage devices and a storage device in the second set of storage devices, by comparing a first storage usage information created prior to failure of the failed storage device and a second storage usage information created after the up-to-date data is written to the replacement storage device, wherein the first storage usage information is a point-in-time representation of a file system and the second storage usage information is another point-in-time representation of the file system; and
  updating data in the surviving storage device based on a difference between the first storage usage information and the second storage usage information, wherein the difference represents data written to the second set of storage devices when the first set of storage devices is in a degraded state.

15. The method of claim 14 wherein the first set of storage devices comprises groups of storage devices configured in accordance with RAID level 4.

16. The method of claim 14, wherein the difference is stored in a previously unused block in the second set of storage devices.

17. The method of claim 14, further comprising:
  storing write data in a storage device in the first set of storage devices while concurrently resynchronizing the storage device.

18. A computer-readable storage medium comprising:
  computer-readable program code for copying up-to-date data to a first group of storage devices, the first group of storage devices belonging to a first set of storage devices that also includes a second group of storage devices;
  computer-readable program code for determining a difference between the first set of storage devices and a second set of storage devices, the first set of storage devices and the second set of storage devices forming a mirror, wherein the difference is determined by comparing a first storage usage information created prior to failure of a failed storage device in the second set and a second storage usage information created after the up-to-date data is written to the second set,
  wherein the first storage usage information is a point-in-time representation of a file system in the mirror and the second storage usage information is another point-in-time representation of a file system in the mirror; and
  computer readable-program code for resynchronizing the first set of storage devices with the second set of the storage devices based on a difference between the first storage usage information and the second storage usage information, wherein the difference represents data written to the first set of storage devices when the second set of storage devices is in a degraded state.

19. The computer-readable storage medium of claim 18 wherein the first group of storage devices comprises storage devices configured in accordance with RAID level 4.

20. The computer-readable storage medium of claim 18 wherein the second set of storage devices comprises a third group of storage devices that forms a mirror with the first group of storage devices and a fourth group of storage devices that forms a mirror with the second group of storage devices.

21. The computer-readable storage medium of claim 18, wherein the difference comprises one or more blocks that are in the second storage usage information and are not in the first storage usage information.

22. The computer-readable storage medium of claim 18, wherein the difference is stored in a previously unused block in the second group of storage devices.

23. The computer-readable storage medium of claim 18, wherein write data is stored in a storage device in the second set of storage devices while concurrently resynchronizing the storage device.

24. A method of resynchronizing mirrored-storage devices comprising:
  copying up-to-date data to a first group of storage devices, the first group of storage devices belonging to a first set of storage devices that also includes a second group of storage devices;
  determining a difference between the first set of storage devices and a second set of storage devices, the first set of storage devices and the second set of storage devices forming a mirror, wherein the difference is determined by comparing a first storage usage information created prior to failure of a failed storage device in the first set and a second storage usage information created after the up-to-date data is written to the first group, wherein the first storage usage information is a point-in-time representation of a file system in the mirror and the second storage usage information is another point-in-time representation of a file system in the mirror; and
  resynchronizing the first set of storage devices with the second set of the storage devices based on a difference between the first storage usage information and the second storage usage information, wherein the difference represents data written to the second set of storage devices when the first set of storage devices is in a degraded state.

25. The method of claim 24 wherein the first group of storage devices comprises storage devices configured in accordance with RAID level 4.

26. The method of claim 24 wherein the second set of storage devices comprises a third group of storage devices that forms a mirror with the first group of storage devices and a fourth group of storage devices that forms a mirror with the second group of storage devices.

27. The method of claim 24, wherein the difference is stored in a previously unused block in the second group of storage devices.

* * * * *